3,836,536
1,2,3,4-TETRAHYDRO-3-AMINOMETHYLISO-QUINOLINES

Glenn C. Morrison, Dover, and Wiaczeslaw A. Cetenko, Parsippany, N.J., assignors to Warner-Lambert Company, Morris Plains, N.J.
No Drawing. Filed June 8, 1972, Ser. No. 260,884
Int. Cl. C07d 35/10
U.S. Cl. 260—286 R  9 Claims

ABSTRACT OF THE DISCLOSURE 1,2,3,4-Tetrahydro-3-aminomethylisoquinolines of the formula:

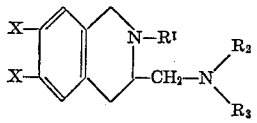

wherein $R_1$ represents hydrogen, a lower alkyl or an aralkyl radical; $R_2$ represents hydrogen, a lower alkyl, an aryl, an aralkyl, a substituted aralkyl, a heterocyclic alkyl or a guanyl radical; $R_3$ represents hydrogen or a lower alkyl radical; and X represents hydrogen or a lower alkoxy radical, and the process for preparing these compounds starting with the corresponding tetrahydroisoquinolinecarboxylate are described. The compounds have useful anti-arrhythmic properties.

---

This invention relates to new and useful heterocyclic compounds and relates more particularly to new 1,2,3,4-tetrahydro-3-aminomethylisoquinolines having the formula:

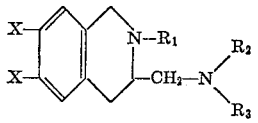

wherein $R_1$ represents hydrogen, a lower alkyl or an aralkyl radical; $R_2$ represents hydrogen, a lower alkyl, an aryl, an aralkyl, a substituted aralkyl, a heterocyclic alkyl or a guanyl radical; $R_3$ represents hydrogen or a lower alkyl radical; and X represents hydrogen or a lower alkoxy radical.

Also embraced within the scope of this invention are the pharmaceutically accepted acid addition salts of the afore-described bases, their quaternary ammonium salts and N-oxides.

In the definitions for $R_1$, $R_2$, $R_3$, and X above, the alkyl group in the terms "lower alkyl" and "lower alkoxy" includes a lower aliphatic hydrocarbon having from 1 to 6 carbon atoms in the carbon chain; the chain may be a straight or branched carbon chain. Thus, for example, methyl, ethyl, propyl, isopropyl, butyl, isobutyl and the like exemplify possible alkyl groups in the lower alkyl or lower alkoxy radical which may be substituted on the $R_1$, $R_2$, $R_3$ or X positions of the isoquinoline compounds of this invention.

The term "aryl" connotes a monocyclic or bicyclic hydrocarbon radical, preferably of 6 to 10 carbon atoms, such as for example, phenyl, naphthyl and the like.

The term "aralkyl" includes aryl radicals, as described above, being attached through an alkyl group to the parent structure, the alkyl group being as described above, preferably a methyl group.

The term "substituted aralkyl" connotes an aralkyl radical as described above having attached to the aryl radical a lower alkoxy group of 1 to 3 carbon atoms. The alkoxy group may be located in an ortho-, meta-, or para- position with reference to the alkyl group on the aryl ring.

The term "heterocyclic alkyl" is meant to include mono- or bicyclic hydrocarbon rings containing 5 to 10 atoms, including one or more hetero atoms, such as oxygen or nitrogen, within the ring itself; the heterocyclic ring being attached through an alkyl group to the parent structure, the alkyl group being as described above, preferably a methyl group. As representative of the above described heterocyclic alkyl radicals, there may be mentioned furylmethyl, pyridylmethyl, indolylmethyl, (methylenedioxy) benzyl, and the like.

Specific suitable compounds having formula 1 above include:

3-(Aminomethyl)-2-phenyl-6,7-dimethoxy-1,2,3,4-tetrahydroisoquinoline
2-Benzyl-3-(N,N-diethylaminomethyl-1,2,3,4-tetrahydro-isoquinoline Dihydrochloride)
3-Aminomethyl-2-butyl-1,2,3,4-tetrahydroisoquinoline
2-Benzyl-3-[(o-methoxybenzylamino)methyl]-1,2,3,4-tetrahydroisoquinoline
2-Benzyl-3-[(m-methoxybenzylamino)methyl]-1,2,3,4-tetrahydroisoquinoline
2-Benzyl-3-[(3-pyridylmethylamino)methyl]-1,2,3,4-tetrahydroisoquinoline
2-Benzyl-3-[(4-pyridylmethylamino)methyl]-1,2,3,4-tetrahydroisoquinoline
2-Benzyl-3-[(3-indolylmethylamino)methyl]-1,2,3,4-tetrahydroisoquinoline The symbols $R_1$, $R_2$, $R_3$ and X as used hereinafter have the above described meanings.

The compounds of this invention are prepared from a tetrahydroisoquinolinecarboxylate of the formula 2 below:

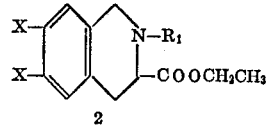

The starting tetrahydroisoquinoline carboxylate is prepared according to the procedure appearing in Julian, P. L. et al., J. Am. Chem. Soc. 70: 182–183 (1948).

The $R_1$ group in Formula 2 above can be inserted either by alkylation with an alkyl halide or treatment with an aldehyde in the presence of a reducing agent.

The ester group of Formula 2 is converted to an amide of the Formula 3 below by hydrolysis to the acid, conversion to the acid chloride and treatment with the appropriate amine:

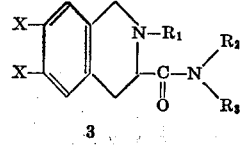

Reduction of the amide in Formula 3 with a metal hydride, such as lithium aluminum hydride, affords the tetrahydro-3-aminomethylisoquinolines of this invention having Formula 4 below:

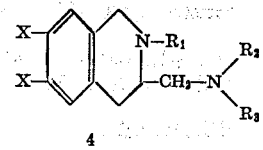

When $R_1$ in Formula 4 is benzyl it may be converted to the corresponding hydrogen derivatives by hydrogenolysis.

When $R_2$ and $R_3$ in Formula 4 are hydrogen, they may be converted to alkylated derivatives by treatment with aldehydes and reducing agent. Also, $R_2$ and $R_3$ may be converted to guanides by treatment with guanyldimethylpyrazole.

The compounds of this invention exhibit anti-arrhythmic activity, for example, at a dosage of about 2 to 10 mg./kg. body weight, preferably 4 to 10 mg./kg. body weight in mammals such as dogs, cats, monkeys and the like. In experimentally induced arrhythmia, such as those induced by ouabain, at a dosage of 2 to 10 mg./kg., the compounds of this invention are capable of arresting such arrhythmia. Generally speaking, the compounds of this invention are useful in conditions associated with cardiac arrhythmia. A dosage level of about 2 to 10 mg., several times daily is recommended. This dosage regimen can be varied according to body weight, sex, species of the mammal being treated.

Among the dosage forms which can be used to administer these compounds are, for example, tablets, powders, elixirs, suspensions and the like. These dosage forms are formulated by procedures known to the pharmacist's art.

In order to further illustrate the practice of the invention, the following examples are included:

EXAMPLE 1

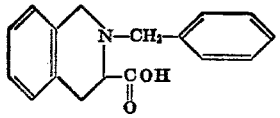

2 - Benzyl - 1,2,3,4-tetrahydroisoquinoline-3-carboxylic Acid.—A mixture of 116 g. of ethyl-1,2,3,4-tetrahydroisoquinoline-3-carboxylate, 97 g. of benzyl bromide, 78.2 g. of potassium carbonate and 750 ml. of dimethyl formamide was heated at 110° with stirring for 20 hrs. The solvent was removed at 110° under water aspirator pressure. The residue was treated with 700 ml. of water and 1.5.1. of ether. The ether layer was washed with water, dried over sodium sulfate and the solvent was removed. There remained 155 g. of an oil. To a solution of 53 g. of sodium hydroxide in 200 l. of water was added a solution of the ester in 100 ml. of ethanol and the mixture was heated on the steam bath for 1 hr. The reaction mixture was made acidic to congo red and filtered. Recrystallization from methanol gave 127 g. (84%) of a solid, m.p. 187–188°.

*Analysis.*—Calcd. for $C_{17}H_{17}NO_2$: C, 76.38; H, 6.41; N, 5.24. Found: C, 76.62; H, 6.50; N, 5.30.

EXAMPLE 2

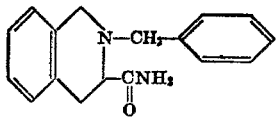

2 - Benzyl - 1,2,3,4 - tetrahydroisoquinoline - 3 - carboxamide.—To a mixture of 191 g. of 2-benzyl-1,2,3,4-tetrahydroisoquinoline-3-carboxylic acid and 72 g. of triethylamine in 3 l. of methylene chloride was added 77 g. ethyl chloroformate at —7° over a 15 min.-interval. To the resulting solution was added 1.1 l. of ammonia and the mixture was allowed to stand overnight. The reaction mixture was poured into 1.5 l. of water. The methylene chloride layer was washed with water, dried over sodium sulfate and the solvent was removed. Recrystallization from benzene gave 170 g. (89%) of a solid, m.p. 145–146°.

*Analysis.*—Calcd. for $C_{17}H_{18}N_2O$: C, 76.66; H, 6.81; N, 10.52. Found: C, 76.91; H, 6.96; N, 10.35.

EXAMPLE 3

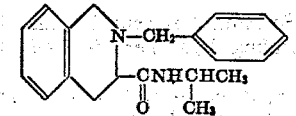

2 - Benzyl - 1,2,3,4-tetrahydro-3-(N-isopropyl)isoquinolinecarboxamide.—A mixture of 53.5 g. of 2-benzyl-1,2,3,4-tetrahydro-3-isoquinolinecarboxylic acid and 20.2 g. of triethylamine in 600 ml. of methylene chloride was cooled to —7° (±1°) and 21.7 g. of ethyl chloroformate was added over a 15 min.-interval with stirring. After the complete addition the mixture was kept for 45 min. at the above temperature. To this solution was added 11.8 g. of isopropylamine in 200 ml. of methylene chloride and the mixture was allowed to stand at room temperature overnight. The mixture was poured into 1 l. of cold water. The organic layer was separated, washed with water, dried over sodium sulfate and the solvent was removed. There was obtained 60 g. (97%) of a solid, m.p. 102–3°. Recrystallization from ethanol afforded an analytical sample, m.p. 105–6°.

*Analysis.*—Calcd. for $C_{20}H_{24}N_2O$: C, 77.89; H, 7.84; N, 9.08. Found: C, 78.05; H, 7.86; N, 8.86.

EXAMPLE 4

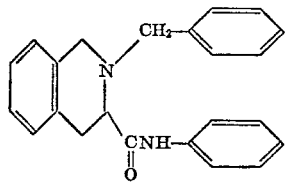

2 - Benzyl - 1,2,3,4-tetrahydro-3-[(N-phenyl)isoquinolinecarboxamide].—A mixture of 40 g. of 2-benzyl-1,2,3,4-tetrahydro-3-isoquinolinecarboxylic acid and 21 ml. of triethylamine in 500 ml. of methylene chloride was held at —7° (±1) while 14.4 ml. of ethyl chloroformate was added over a 10 min. interval with stirring. Stirring was continued at —7° for 1 hr., then a solution of 14.0 g. of aniline in 100 ml. of methylene chloride was added over a 10 min-interval. Stirring was continued at —7° for 45 min., then at room temperature for 5 hr. After standing overnight at room temperature, the solution was washed with water, dried over sodium sulfate and the solvent was removed. Recrystallization from ethanol gave 44.5 g. (87%) of a solid m.p. 125–6°.

*Analysis.*—Calcd. for $C_{23}H_{22}N_2O$: C, 80.67; H, 6.48; N, 8.18. Found: C, 80.54; H, 6.48; N, 8.17.

EXAMPLE 5

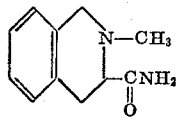

2 - Methyl - 1,2,3,4 - tetrahydro-3-isoquinolinecarboxamide.—To a solution of 102 g. of ethyl-1,2,3,4-tetrahydro-3-isoquinolinecarboxylate in 236 ml. of formic acid, 170 ml. of formaldehyde (36.9%) was added at 0° with stirring. After heating on a steambath for 24 hrs., the solvent was removed under reduced pressure. The residue was treated with absolute ethanol and evaporated to dryness. In a 3-liter three-necked flask was placed a mixture of 2 l. of absolute ethanol and 102 g. of the preceding acid. While stirring vigorously, 190 ml. of thionyl chloride was added over 25 min.-period (temperature of the reaction mixture 30–60°). After overnight reflux, the solvent was removed. The residue was suspended in 2 l. of ether, 250 ml. of triethylamine was added and the mixture was stirred for 3 hrs. The triethylamine hydrochloride was removed by filtration and the solvent was removed. Distillation of the residue gave 89 g. (81%) of an oil, b.p.$_{0.1}$ 102°. A mixture of the ester, 125 ml. of ethanol, 250 ml. of water and 66 g. of sodium hydroxide was refluxed for 2 hrs. The reaction mixture was neutralized with hydrochloric acid to pH 6 while the temperature was held below 20°. The solution was evaporated to dryness under water aspirator pressure. The residue was treated with absolute ethanol and evaporated to dryness.

Recrystallization from methanol gave 59 g. of a solid, m.p. 259–260° dec. A mixture of 59 g. of the acid 43 ml. of triethylamine and 1.4 l. of methylene chloride was held at −7° (±1°) while 29.4 ml. of ethylchloroformate was added over a 10 min.-interval with stirring. Stirring was continued for 1 hr. at the above temperature. Stirring was discontinued and 840 ml. of liquid ammonia was added. After standing overnight at room temperature, the mixture was poured into 1.7 l. of cold water. The organic layer was separated, washed with cold water, dried over sodium sulfate and evaporated to dryness. There was obtained 24.8 g. (26%) of solid, m.p. 160–1°. Recrystallization from ethyl acetate afforded an analytical sample, m.p. 162–163°.

Analysis.—Calcd. for $C_{11}H_{14}N_2O$: C, 69.45; H, 7.42; N, 14.72. Found: C, 69.33; H, 7.36; N, 14.65.

EXAMPLE 6

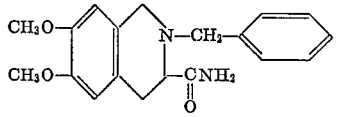

2 - Benzyl - 6,7 - dimethoxy - 1,2,3,4 - tetrahydro - 3 - isoquinoline-carboxamide.—A mixture of 87.0 g. of ethyl 6,7 - dimethoxy - 1,2,3,4 - tetrahydro - 3 -isoquinoline - carboxylate hydrochloride, 49.3 g. of benzyl bromide, 79.5 g. of potassium carbonate and 1 l. of dimethyl formamide was stirred at 100° for 20 hr. The solvent was removed under water aspirator pressure. The reaction mixture was poured into 1 l. of water and extracted with ether. The etheral layer was washed with water, dried over sodium sulfate and the solvent was removed. A mixture of the crude ester, 43 g. of sodium hydroxide, 100 ml. of ethanol and 160 ml. of water was heated on the steambath for 3.5 hrs. The pH was adjusted to 6 and the solvent was removed. The solid residue was washed with water and ethanol. To a mixture of the acid and 21.5 g. of triethylamine in 1 l. of methylene chloride was added 23.0 g. of ethylchloroformate over a 20 min.-interval while the temperature was held below 7°. Stirring was continued for 1 hr. at 0°. Stirring was discontinued and 800 ml. of liquid ammonia was added. The mixture was allowed to stand at room temperature overnight. The reaction mixture was poured into 1 l. of cold water. The organic layer was separated, washed with water, dried over sodium sulfate, and the solvent was removed to 68 g. (68%) of a solid, mp. 144–6°. Recrystallization from ethanol and then from ethyl acetate afforded an analytical sample, m.p. 149–150°.

Analysis.—Calcd. for $C_{19}H_{22}N_2O_3$: C, 69.92; H, 6.79; N, 8.58. Found: C, 69.73; H, 6.64; N, 8.57.

EXAMPLE 7

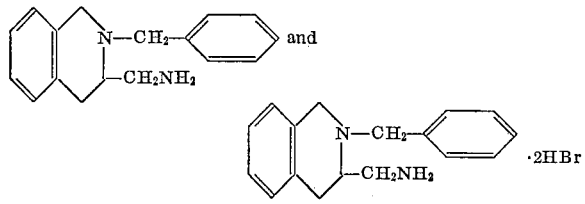

3 - (Aminomethyl) - 2 - benzyl - 1,2,3,4 - tetrahydroisoquinoline.—To a solution of 40 g. of lithium aluminum hydride in 1 l. of tetrahydrofuran was added a solution of 156 g. of 2-benzyl-1,2,3,4-tetrahydroisoquinoline-3-carboxamide in 2 l. of tetrahydrofuran. The resulting solution was refluxed for 20 hr. The excess hydride was destroyed by the cautious addition of water. The mixture was filtered and the solvent was removed. The residue was dissolved in 2 l. of ether and make acidic with hydrogen chloride. The precipitate was dissolved in water, made basic with sodium hydroxide solution and extracted with ether. The ether layer was washed with water, dried over sodium sulfate and the solvent was removed. Distillation gave 132 g. (92%) of an oil $b_{1.0}$ 1550. On standing, the oil turned to a crystalline solid, m.p. 51–52°.

Analysis.—Calcd. for $C_{17}H_{20}N_2$: C, 80.91; H, 7.99; N, 11.10. Found: C, 80.97; H, 7.96; N, 11.25.

The dihydrobromide formed in ether. Recrystallization from ethanolethyl acetate gave an analytical sample, m.p. 204–206°.

Analysis.—Calcd. for $C_{17}H_{20}N_2 \cdot 2HBr$: C, 49.30; H, 5.35; N, 6.76; Br, 38.59. Found: C, 49.03; H, 5.32; N, 6.97; Br, 38.49.

EXAMPLE 8

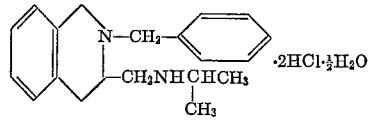

2 - Benzyl - 1,2,3,4 - tetrahydro - 3 - [(isopropylamino)methyl]isoquinoline Dihydrochloride Hemihydrate.—A solution of 233 g. 2-benzyl-1,2,3,4-tetrahydro-N-isopropyl-3-isoquinolinecarboxamide in 200 ml. of tetrahydrofuran was added over a 30 min.-interval to a suspension of 20 g. of $LiAlH_4$ in 1.3 l. of warm tetrahydrofuran. The mixture was refluxed with stirring for 34 hr. The excess hydride was destroyed by the cautious addition of water. The mixture was filtered and the solvent was removed. There remained 19 g. of an oil which was chromatographed on 400 g. of silica-gel. Elution with acetone gave 13.5 of an oil which was rechomatographed over 300 g. of alumina (300 g.). Elution with methylene chloride afforded 5.6 g. of an oil. The oil was taken up in ether and excess ethanolic hydrogen chloride was added. Recrystallized from ethanol-ether and acetone-ether gave 4.2 g. (15%) of a solid, m.p. 148–150°.

Analysis.—Calcd. for $C_{20}H_{28}N_2 \cdot 2HCl \cdot \frac{1}{2}H_2O$: C, 63.83; H, 7.77; N, 7.44; Cl, 18.84. Found: C, 64.42; H, 7.94; N, 7.69; Cl, 18.54.

EXAMPLE 9

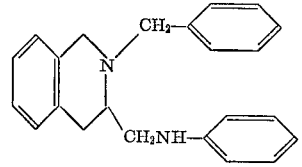

2 - Benzyl - 3 - [(phenylamino)methyl] - 1,2,3,4 - tetrahydroisoquinoline.—A solution of 30.4 g. of 2-benzyl-1,2, 3,4 - tetrahydro - 3 - [(N - phenyl)isoquinoline]carboxamide in 500 ml. of THF was added during 30 min. to a stirred suspension of 9 g. of lithium aluminum hydride in 1 l. of warm tetrahydrofuran. The mixture was refluxed for 17 hr. The excess hydride was decomposed by the dropwise addition of water. The mixture was filtered and the solvent was removed. The residue was chromatographed on basic aluminum. Elution with benzene, then with methylene chloride followed by recrystallization from ethanol gave 20 g. (68%) of a solid, m.p. 71.5–73°.

Analysis.—Calcd. for $C_{23}H_{24}N_2$: C, 84.10; H, 7.37; N, 8.53. Found: C, 84.14; H, 7.37; N, 8.54.

EXAMPLE 10

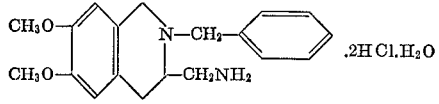

2 - Benzyl - 3 - aminomethyl - 6,7 - dimethoxy - 1,2,3,4-tetrahydroisoquinoline Dihydrochloride Monohydrate.—A solution of 45.7 g. of 2-benzyl-1,2,3,4-tetrahydro-6,7-dimethoxy-3-isoquinolinecarboxamide in 1 l. of warm THF was added over a 45 min.-interval to a slurry of 14 g. of lithium aluminum hydride in 1 l. of warm tetrahydrofuran. The mixture was refluxed for 18 hr. The excess hydride was destroyed by the cautious addition of water. The mixture was filtered and the solvent was removed. There remained 39 g. of an oil which was chromatographed on 300 g. of alumina. Elution with chloroform gave an oil. Distillation afforded 23.9 g. (54%) of an oil, b.p. 213–214° (0.1 mm.). The base (14.8 g.) was dissolved in ether and excess ethanolic hydrogen chloride was added. Recrystallization from ethanol-ether and chloroform-ether afforded 17 g. (89%) of a solid, m.p. 180–182°.

*Analysis.*—Calcd. for $C_{19}H_{24}N_2O_2 \cdot 2HCl \cdot H_2O$: C, 56.58; H, 7.0; N, 6.94; Cl, 17.58. Found: C, 56.45; H, 7.10; N, 7.05; Cl, 17.91.

EXAMPLE 11

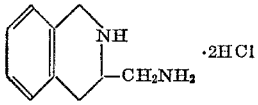

3 - Aminomethyl-1,2,3,4 - tetrahydroisoquinoline Dihydrochloride.—A solution of 12.6 g. of 3-ammninomethyl-2-benzyl-1,2,3,4-tetrahydroisoquinoline in 230 ml. of ethanol and 40 ml. of hydrochloric acid was shaken with 2 g. palladium black (100%) and 2 g. palladium on carbon (5%) in a hydrogen atmosphere for 7 hrs. The theoretical amount of hydrogen was absorbed in 4½ hrs. After removal of the catalyst and solvent, there was obtained 11.7 g. solid, m.p. 246–248° C. Recrystallization from ethanol gave 9.7 g. (83%) of an analytical sample, m.p. 247–249°.

*Analysis.*—Calcd. for $C_{10}H_{14}N_2 \cdot 2HCl$: C, 51.08; H, 6.86; N, 11.91; Cl, 30.15. Found: C, 50.82; H, 6.92; N, 11.88; Cl, 29.90.

EXAMPLE 12

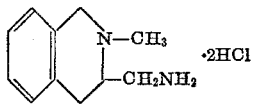

3 - Aminomethyl-2-methyl-1,2,3,4 - tetrahydroisoquinoline Dihydrochloride.—A solution of 6.85 g. of 2-methyl-1,2,3,4-tetrahydro-3-isoquinolinecarboxamide in 200 ml. of warm tetrahydrofuran was added during a 20 min.-interval to a slurry of 6.85 g. of lithium aluminum hydride in 500 ml. of warm tetrahydrofuran. The mixture was refluxed for 20 hrs. The reaction mixture was cooled in ice while the excess of hydride was destroyed by the cautious addition of water. The precipitate was filtered and washed with warm tetrahydrofuran. Removal of the solvent gave 6.35 g. of an oil. The crude base was dissolved in ether and ethanolic hydrogen chloride was added. There was deposited 8.8 g. (98%) of a solid, m.p. 254–256°. Recrystallization from methanol gave an analytical sample, m.p. 255–257°.

*Analysis.*—Calcd. for $C_{11}H_{16}N_2 \cdot 2HCl$: C, 53.02; H, 7.28; N, 11.24; Cl, 28.46. Found: C, 53.21; H, 7.39; N, 11.31; Cl, 28.42.

EXAMPLE 13

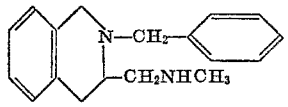

2 - Benzyl-3(N-methylaminomethyl) - 1,2,3,4-tetrahydroisoquinoline.—A mixture of 90 g. of 3-aminomethyl-2 - benzyl-1,2,3,4 - tetrahydroisoquinoline in 300 ml. of ethyl formate was refluxed for 5 hours. The excess ethyl formate was removed. The residue was dissolved in 1 l. of warm tetrahydrofuran and added dropwise over a 30 min.-interval to a stirred suspension of 21.6 g. of lithium aluminum hydride in 1.3 l. of warm tetrahydrofuran. After a reflux period of 8 hours, the reaction mixture was cooled in ice while the excess hydride was destroyed by the cautious addition of water. The precipitate was filtered and washed with warm tetrahydrofuran (500 ml.). Removal of the solvent and short pass distillation of the residue gave 85.7 g. (91%) of a oil, $b_{0.1}$ 150°.

*Analysis.*—Calcd. for $C_{18}H_{22}N_2$: C, 81.16; H, 8.33; N, 10.52. Found: C, 81.44; H, 8.35; N, 10.46.

EXAMPLE 14

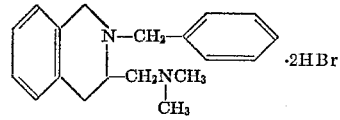

2 - Benzyl-3 - (N-N-dimethylaminomethyl) - 1,2,3,4,-tetrahydroisoquinoline Dihydrobromide.—To 14.1 g. (0.056 mole) of 3-aminomethyl-2-benzyl-1,2,3,4-tetrahydroisquinoline was added 12.3 ml. of formic acid (90.7%), and then 9.4 ml. of a 36.9% formalin solution was added with cooling. The mixture was refluxed for 3 hours, then 24.6 ml. of formic acid and 18.8 ml. of formalin were added and refluxing was continued for 8 hours. The formic acid and excess of formaldehyde were removed. The residue was dissolved in water, made basic with 25% sodium hydroxide and extracted with ether. The ethereal extract was washed with water, dried over sodium sulfate and the solvent was removed to give 15.7 g. of an oil. The oil was dissolved in ether and ethanolic hydrogen bromide was added. There was deposited 24.6 g. (99%) at a solid, m.p. 226–228°. Recrystallization from isopropanol-methanol gave an analytical sample, m.p. 228–229°.

*Analysis.*—Calcd. for $C_{19}H_{24}N_2 \cdot 2HBr$: C, 51.60; H, 5.93; N, 6.33; Br, 36.14. Found: C, 51.80; H, 5.95; N, 6.47; Br, 36.31.

EXAMPLE 15

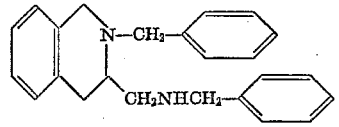

2 - Benzyl-3-(N-benzylaminomethyl) - 1,2,3,4-tetrahydroisoquinoline.—A mixture of 16 g. of 3-aminomethyl-2-benzyl-1,2,3,4-tetrahydroisoquinoline and 6.75 g. of benzaldehyde in 250 ml. of xylene was refluxed for 6 hours. The theoretical amount of water was collected in a Dean-Stark Trap. The mixture was evaporated to dryness under reduced pressure to give an oily residue. To a solution of the base in 250 ml. of methanol was added in small portions 7 g. (0.175 mole) of sodium borohydride. The temperature of the mixture was kept below 20° by cooling in an icebath. Stirring was continued for 20 min. at room temperature and then the mixture was refluxed on a steambath for 70 min. The methanol was removed, water was added, and the mixture was extracted with ether. The extract was dried over sodium sulfate and the solvent was removed. Distillation through a short pass column gave 17 g. (78%) of an oil, $b_{0.1}$ 225°.

*Analysis.*—Calcd. for $C_{24}H_{26}N_2$: C, 84.17; H, 7.65; N, 8.18. Found: C, 84.24; H, 7.54; N, 8.38.

EXAMPLE 16

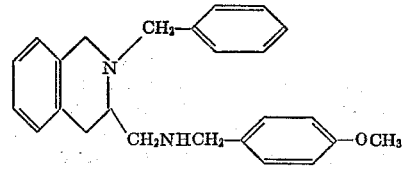

2 - Benzyl-3-[(p-methoxybenzylamino)methyl]-1,2,3,4-tetrahydroisoqunioline.—A mixture of 25.2 g. of 3-aminomethyl - 2 - benzyl-1,2,3,4-tetrahydroisoquinoline and 13.6 g. of p-anisaldehyde in 250 ml. of xylene was refluxed for 4 hr. The theoretical amount of water was collected in a Dean-Stark trap. The mixture was evaporated to dryness under reduced pressure to give an oily residue. To a solution of the preceding base in 400 ml. of absolute ethanol was added in small portions 15.4 g. of sodium borohydride. The temperature of the mixture was kept below 0° by cooling in an icebath. Stirring was continued for 1½ hr. at room temperature and then the mixture was refluxed on a steam bath for 2 hr. The ethanol was removed, water was added, and the mixture was extracted with ether. The extract was dried over sodium sulfate and the solvent was removed. Distillation through a short pass column gave 21.3 g. (57%) of an oil, $b_{0.85}$ 239°.

Analysis.—Calcd. for $C_{25}H_{28}N_2O$: C, 80.61; H, 7.58; N, 7.52. Found: C, 80.50; H, 7.55; N, 7.38.

EXAMPLE 17

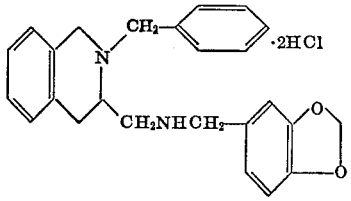

2 - Benzyl-1,2,3,4-tetrahydro-3 - [(3,4-methylenedioxybenzylamino)methyl]isoquinoline Dihydrochloride. — A mixture of 12.61 g. of 3-aminomethyl-2-benzyl-1,2,3,4-tetrahydroisoquinoline and 7.51 g. of piperonal in 250 ml. of xylene was refluxed for 7 hr. The theoretical amount of water was collected in a Dean-Stark trap. The mixture was evaporated to dryness under reduced pressure to give oily residue in quantitative yield. To a solution of the precednig base in 250 ml. of ethanol was added 7.7 g. of sodium borohydride. The temperature of the mixture was kept below 0° by cooling in an icebath. Stirring was continued for 20 min. at room temperature and then the mixture was refluxed on a steam bath for 2 hr. After ethanol had been distilled off, water was added to the resultant residue and the mixture was extracted with ether. The extract was dried over sodium sulfate. Removal of the solvent gave a viscous oil. This mixture was chromatographed on 700 g. of basic alumina. Elution of the column with benzene gave 18 g. of oil. The base was dissolved in ether and ethanolic hydrogen chloride was added. There was deposited 19 g. (83%) of a white solid, m.p. 159–161° d. Recrystallization from ethanol-ethylacetate gave an analytical sample, m.p. 160-2 d.

Analysis.—Calcd. for $C_{25}H_{28}N_2O_2 \cdot 2HCl$: C, 65.36; H, 6.14; N, 6.10; Cl, 15.43. Found: C, 65.57; H, 5.86; N, 6.02; Cl, 15.45.

EXAMPLE 18

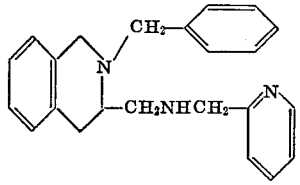

2 - Benzyl - 1,2,3,4 - tetrahydro - 3 - [(2-pyridylmethylamino)methyl]-isoquinoline.—A mixture of 20 g. of 3-aminomethyl-2-benzyl-1,2,3,4-tetrahydroisoquinoline and 8.55 g. of 2-pyridinecarboxaldehyde in 250 ml. of xylene was refluxed for 4 hr. The theoretical amount of water was collected in a Dean-Stark trap. The mixture was evaporated to dryness to give oily residue. To a solution of the base in 250 ml. of methanol was added in small portions 15 g. of sodium borohydride. The temperature of the mixture was kept below 0° by cooling in an ice-salt bath. Stirring was contined for 1.5 hr. at room temperature, and then the mixture was refluxed on a steam bath for 2 hr. The methanol was removed, water was added and the mixture was extracted with benzene. The extract was dried over sodium sulfate and the solvent was removed. Distillation through a short pass column gave 13.7 g. (50%) of an oil $b_{0.25}$ 222°.

Analysis.—Calcd. for $C_{23}H_{25}N_3$: C, 80.43; H, 7.34; N, 12.24. Found: C, 80.44; H, 7.39; N, 12.52.

EXAMPLE 19

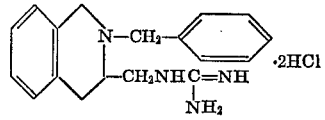

2 - Benzyl - 1,2,3,4 - tetrahydro - 3 - [(guanyl)aminomethyl]isoquinoline Dihydrochloride.—A mixture of 12.62 g. of 2-benzyl-3-aminomethyl-1,2,3,4-tetrahydroisoquinoline and 10.06 g. of 1-guanyl-3,5-dimethylpyrazole nitrate in 130 ml. of ethanol was refluxed for 16 hr. The resultant solution was evaporated to dryness in vacuo and the oily residue was triturated with ether. The residue was dissolved in water. The solution was basified with sodium carbonate and sodium bicarbonate while temperature was held below 15° and extracted with chloroform. The extract was dried over sodium sulfate and the solvent was removed. The residue was chromatographed on 220 g. of silica gel (Grace 100–200 mesh). Elution of the column with ethylacetate:methanol (9:1) gave 12.1 g. of an oil. The base was dissolved in ethanol and ethanolic hydrogen chloride was added. There was deposited 16 g. (85%) of a solid mp. 156 d. Recrystallization from ethanol-ether gave an analytical sample, m.p. 158 d.

Analysis.—Calcd. for $C_{18}H_{22}N_4 \cdot 2HCl$: C, 58.86; H, 6.59; N, 15.25; Cl, 19.30. Found: C, 57.93; H, 7.14; N, 14.54; Cl, 17.69.

What is claimed is:

1. A 1,2,3,4 - Tetrahydro - 3 - aminomethylisoquinoline having the formula:

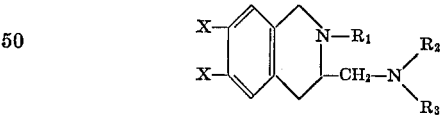

wherein $R_1$ is hydrogen, 1 to 6 carbon lower alkyl, or benzyl; $R_2$ is hydrogen, 1 to 6 carbon lower alkyl, phenyl, benzyl, alkoxy substituted benzyl wherein the alkoxy group has from 1 to 3 carbon atoms, pyridylmethyl, or guanyl; $R_3$ is hydrogen or 1 to 6 carbon lower alkyl; and X is hydrogen or 1 to 3 carbon lower alkoxy; and the nontoxic, pharmaceutically acceptable salts thereof.

2. A 1,2,3,4 - tetrahydro - 3 - aminomethylisoquinoline according to Claim 1 wherein $R_1$ is hydrogen or benzyl; $R_2$ is hydrogen, methyl, benzyl, or pyridylmethyl; $R_3$ is hydrogen or methyl; and X is hydrogen or methoxy.

3. The compound according to Claim 1 which is 3-(aminomethyl)-2-benzyl - 1,2,3,4 - tetrahydroisoquinoline dihydrobromide.

4. The compound according to Claim 1 which is 2-benzyl-3-aminomethyl - 6,7 -dimethoxy - 1,2,3,4 - tetrahydroisoquinoline dihydrochloride monohydrate.

5. The compound according to Claim 1 which is 3-aminomethyl-1,2,3,4-tetrahydroisoquinoline dihydrochloride.

11

6. The compound according to Claim 1 which is 2-benzyl - 3 - (N-benzylaminomethyl - 1,2,3,4 - tetrahydroisoquinoline.

7. The compound according to Claim 1 which is 2-benzyl - 1,2,3,4 - tetrahydro-3-[(2-pyridylmethylamino)methyl]-isoquinoline.

8. A compound according to Claim 1 which is 2-benzyl-3(N-methylaminomethyl)-1,2,3,4-tetrahydroisoquinoline.

9. A compound according to Claim 1 which is 2-benzyl-3-(N,N-dimethylaminomethyl) - 1,2,3,4 - tetrahydroisoquinoline dihydrobromide.

References Cited
UNITED STATES PATENTS 2,684,965 7/1954 Weston _____ 260—288 R
2,785,159 3/1957 Hoffmann _____ 260—288 R

12

3,277,085 10/1960 Aebi et al. _____ 260—288 R
3,594,380 7/1971 Sulkowski _____ 260—288 R
3,668,208 6/1972 Baxter _____ 260—288 R

OTHER REFERENCES

Kametani et al., Chem. Abstr., vol. 64, col. 5059f (1966).

CIBA, Chem. Abstr., vol. 67, col. 21848f (1967).

Kametani et al., Chem. Abstr., vol. 68, col. 3947b (1968).

DONALD G. DAUS, Primary Examiner

U.S. Cl. X.R.

260—287 R, 288 R; 424—258